(12) United States Patent
Perera

(10) Patent No.: US 11,473,027 B2
(45) Date of Patent: Oct. 18, 2022

(54) ORGANIC MIXTURE FOR A FUEL SOURCE

(71) Applicant: Bethmage Malinda Thivanka Perera, Colombo (LK)

(72) Inventor: Bethmage Malinda Thivanka Perera, Colombo (LK)

( * ) Notice: Subject to any disclaimer, the term of this patent is extended or adjusted under 35 U.S.C. 154(b) by 66 days.

(21) Appl. No.: 17/266,788

(22) PCT Filed: Jun. 27, 2019

(86) PCT No.: PCT/IB2019/055467
§ 371 (c)(1),
(2) Date: Feb. 8, 2021

(87) PCT Pub. No.: WO2020/035751
PCT Pub. Date: Feb. 20, 2020

(65) Prior Publication Data
US 2021/0348075 A1 Nov. 11, 2021

(30) Foreign Application Priority Data

Aug. 13, 2018 (LK) .............................. LK/P/1/20019

(51) Int. Cl.
| C10L 5/44 | (2006.01) |
| C10L 5/10 | (2006.01) |
| C10L 5/32 | (2006.01) |
| C10L 9/08 | (2006.01) |

(52) U.S. Cl.
CPC ............. *C10L 5/442* (2013.01); *C10L 5/10* (2013.01); *C10L 5/32* (2013.01); *C10L 5/445* (2013.01); *C10L 9/083* (2013.01); *C10L 2200/0469* (2013.01); *C10L 2200/0484* (2013.01); *C10L 2230/10* (2013.01); *C10L 2290/18* (2013.01); *C10L 2290/30* (2013.01)

(58) Field of Classification Search
CPC .... C10L 5/442; C10L 5/10; C10L 5/32; C10L 5/445; C10L 9/083; C10L 2200/0469; C10L 2200/0484; C10L 2230/10; C10L 2290/18; C10L 2290/30; C10L 5/12; C10L 5/14; C10L 5/28; C10L 5/361; C10L 5/363; Y02E 50/10; Y02E 50/30
See application file for complete search history.

(56) References Cited

U.S. PATENT DOCUMENTS

| 2013/0247455 A1* | 9/2013 | Reddy ............... C10L 11/06 44/590 |
| 2018/0255771 A1* | 9/2018 | Hoag ............... A01N 25/34 |

FOREIGN PATENT DOCUMENTS

CN          105132067 A   * 12/2015

* cited by examiner

*Primary Examiner* — Pamela H Weiss
(74) *Attorney, Agent, or Firm* — Patshegen IP; Moshe Pinchas

(57) ABSTRACT

A mixture for a natural fuel package is provided, having essentially a mass of combustible wood particles and particles of organs of a plant in the *Cinnamomum* genus as constituents which are bonded by compression, whereby upon ignition the said particles undergo decomposition to liberate the moisture, releasing an aromatic cinnamon fragrance and flavor which can be inhaled by persons present at the time of burning and tasted or consumed through the food cooked on such fuel resulting in medicinal and therapeutic effects.

12 Claims, No Drawings

ORGANIC MIXTURE FOR A FUEL SOURCE

TECHNICAL FIELD

This invention relates to an improved natural fuel package, more particularly to an improved natural mixture for a fuel source which has medicinal and therapeutic effects; and methods of manufacturing such mixture.

BACKGROUND ART

Conventional fuel packages or fuel sources used in various activities such as cooking, heating, smoking etc. emit smoke and fragrances that are not always healthy to inhale or beneficial to consume.

Healthy cooking in particular requires not only preserving the flavor and nutrition of the food but also addition of flavor and nutrition. In addition to the physical effects, food must essentially contribute to the betterment of the mental health of the consumer and those preparing the food as well.

The conventional solid fuel sources used for cooking or heating include wood, charcoal, peat, coal, Hexamine fuel tablets, wood pellets, corn, wheat, rye, and other grains. Thus Charcoal of a wood taken from a common tree, mixed with a binder is already well-known in the art. Food cooked on charcoal can have a unique flavor and have wide appeal. Briquettes capable of sustained emission of aromatic volatiles during cooking of food over a heated bed of briquettes have also been disclosed, particularly those which use essentially a wood selected from a group consisting of hickory, mesquite, apple, oak, maple, alder, cherry, sassafras, birch, ash, willow, pine etc.

One of the major shortcomings of conventional solid fuel sources, more particularly charcoal fuel packages, is that the smoke emitted from the ignited fuel can be harmful to the respiratory system. Moreover, they can be difficult to ignite and may not continue to burn, even after they appear to have been ignited. To address this problem, conventional charcoal manufacturers often spray petroleum solvent to assist with the ignition. More commonly, a consumer will use lighter fluid, kerosene, petrol or fire-starters to ignite the charcoal. Thus charcoal briquettes often contain potentially harmful constituent materials in addition to the wood or other primary charcoal material such as chemicals. Excessive use of such flammable petroleum-based material or other chemicals, however, may impart unwanted fragrances and flavors and chemicals to the food. Additionally, the use of lighter fluid can emit volatile organic compounds, which can have adverse short and/or long-term health effects. Furthermore, the harmful fumes can be inhaled by being present around the burning charcoal.

SUMMARY OF INVENTION

The present invention, by contrast, relates to a mixture for a fuel source which is 100% natural both in constitution and mode of ignition. The mixture disclosed in the present invention suffers from none of the deficiencies pointed out above with respect to the prior art approaches. A constituent element of the mixture of the present invention is formed from organs of a plant in the *Cinnamomum* genus. While it is known to make charcoal from various types of wood, such charcoal does not contain parts of the Cinnamon plant as a constituent element.

The benefits of the fragrance emitted by parts of plants in the *Cinnamomum* genus are endless. Conventionally, the essential oil derived from the leaves and bark of the cinnamon trees possesses several therapeutic qualities or properties. The essential oil obtained from cinnamon leaves and bark stimulates the body as well as the mind. The cinnamon essential oil is also effective in treating depression diminishing lethargy, petulance, pain and regular headaches. It has been proved that inhaling the cinnamon fragrance is useful in providing relief from infections in the respiratory system. It has been established that a user of cinnamon essential oil experiences an augmentation in their digestive, circulatory and immune systems. In addition to the health benefits, cinnamon fragrance also has the effect of a mosquito repellent. Therefore, when the mixture is ignited, the fragrance and the flavor emitted from it soothes and alleviates any physical or mental discomforts of persons who inhale or consume same, eliminating any adverse effects that may be caused by the smoke and chemical discharges present in prior art disclosures.

Further, the *Cinnamomum* genus being a type of plant on which chemical use to cultivate it is minimal to none the chemical emission when ignited is minimal to none. As a result, once burned, less ash is left which is also a notable advantage.

In the manufacture of cinnamon quills/sticks and oil, most of the organs of the plants in the *Cinnamomum* genus become industrial waste and thus under-utilized. Therefore, using these not only help preserve the environment but is also inexpensive.

In the present invention, the composition, which is preferably compressed into a lump form, is composed of a mass of combustible wood particles and particles of organs of a plant in the *Cinnamomum* genus bonded by compression, whereby upon ignition the said particles undergo decomposition to liberate the moisture, releasing an aromatic cinnamon fragrance and a smoky cinnamon flavor, providing therapeutic effects on persons inhaling the fragrance and tasting the flavor from the food.

The mixture can be used in many fuel sources such as barbeque briquettes, pellets, for smoking Shisha, in the fire place, fuel for boilers for industrial use, as an admixture for fire starters, for campfires, as an admixture for making candles, as incense, as a mosquito and insect repellant etc.

The combustible wood particles may be obtained from any hard or soft wood. In the present invention wood particles from a plant in the *Cinnamomum* genus is preferred in order to maximize the effect of the invention. The size of the wood particles may vary from barks, shavings to saw dust depending on the requirement and availability.

The *Cinnamomum* genus includes many varieties which may be used in the present invention such as Cassia etc. Whilst other forms may also be used, Ceylon Cinnamon/ *Cinnamomum zeylanicum*, *Cinnamomum verum* would give the maximum effect of the invention as it is the purest form of the *Cinnamomum* genus.

Particles of organs of a plant in the *Cinnamomum* genus include leaves, stems, inner bark, shavings from the inner bark, sawdust of inner bark, shavings from the outer bark, cinnamon chips, cinnamon quillings, cinnamon powder and flowers. Most of these can be obtained as by-products from the production of cinnamon sticks/quills & cinnamon essential oils.

DETAILED DESCRIPTION OF THE PREFERRED EMBODIMENTS

In one embodiment of the invention the mixture comprises dried raw wood particles compressed with dried raw particles of organs of a plant in the *Cinnamomum* genus. A binder may or may not be used in the mixture. The moisture in the raw particles in particular assist in binding without requiring an additional binder. The lump may be compressed ideally between medium to high pressure at 100-300 Celsius. The compressed lump is then carbonized ideally at 400-700 Celsius. The carbonization process only carbonizes the peripheral of the lump leaving the core raw.

In another embodiment of the invention the mixture comprises wood particles that are carbonized and grinded before being compressed with dried raw particles of organs of a plant in the *Cinnamomum* genus. A binder may or may not be used in the mixture. Using a binder is preferred in this embodiment as the carbonized wood particles lack adequate moisture to assist in the binding. However, using cinnamon essential oil such as cinnamon leaf oil or bark oil or oily residues of these essential oils as a binder would result in the maximum effect. However, other natural binders may also be used instead or in addition to the said binders. A wide range of binders are commercially available. The binder serves to bind and tightly adhere the ingredients together during the mixing process and after compressed into final form. Other suitable binder materials include water, natural clay, corn starch, wheat starch, maize flour, wheat flour, rice flour, cassava flour, potato starch, essential oils, vegetable oils etc. The compressed lump is then dried.

In all of the embodiments the wood particles may be from any hard or soft wood. However, use of wood from a plant in the *Cinnamomum* genus especially Ceylon Cinnamon/ *Cinnamomum zeylanicum, Cinnamomum verum* would intensify the effect by emitting a stronger cinnamon fragrance and taste. Additionally, other ingredients such as spices, waste agricultural biomass/agricultural residues, renewable parts of trees and plants can be added to the mixture to boost the fragrance and the therapeutic effect. For instance, spices such as cardamom, cloves, nutmeg can be added to give a spice fragrance and smoky taste. Also, waste agricultural biomass such as paddy husk, corn cobs, nutmeg shells, coconut shells etc. can be added to the mixture. Nutmeg shells would give a pleasing fragrance, a smoky nutmeg flavor & boost the therapeutic effects whilst coconut shells would control the heat level. Waste products can also be effectively utilized in an environmentally friendly manner. For example, biomass material which are generated on the agricultural farm or field, known as field-based residues, such as rice straw, sugar cane tops, cocoa pods, tobacco stalks, soybean straw/pods, maize stalks, etc. and those generated during processing of agricultural products, known as process-based residues, such as rice husk, bagasse, maize cob/husk, coffee husk, peanut & cashew shells etc. can be used or added to the mixture.

Embodiments of the invention may be used in any fuel source used in dry burners including in Barbeque briquettes, pellets, for smoking Shisha, in the fire place, fuel for boilers for industrial use, as an admixture for fire starters, for campfires, as an admixture for making candles, as incense, as a mosquito and insect repellant etc.

What is claimed is:

1. A mixture for a fuel source comprising:
   a mass of carbonized wood particles;
   particles of organs of a plant in the *Cinnamomum* genus soaked in *Cinnamomum* oil;
   raw particles of organs of a *Cinnamomum* plant for releasing moisture for binding; and
   *Cinnamomum* oil for spraying, wherein the carbonized wood particles are mixed with raw and soaked particles of the *Cinnamomum* plant.

2. The mixture according to claim 1 further comprising a binder selected from the group consisting of water, natural clay, grain starch, corn starch, wheat starch, maize flour, wheat flour, rice flour, cassava flour, potato starch, essential oils.

3. The mixture according to claim 1 further comprising particles of natural or organic material selected from the group consisting of spices, waste agricultural biomass and/ or agricultural residues and/or renewable parts of trees and plants and combinations thereof.

4. The mixture according to claim 1 wherein organs of the plant in the *Cinnamomum* genus are selected from the group consisting of leaves, stems, inner bark, shavings from the inner bark, sawdust of inner bark, shavings from the outer bark, cinnamon chips, cinnamon quillings, cinnamon powder and flowers.

5. A method of preparing a mixture for a fuel source, the method comprising compression of raw wood particles with raw particles of organs of a plant in the *Cinnamomum* genus and carbonization of the peripheral of the compressed mixture.

6. The method according to claim 5 further comprising a binder selected from the group consisting of water, natural clay, grain starch, corn starch, wheat starch, maize flour, wheat flour, rice flour, cassava flour, potato starch, essential oils.

7. The method according to claim 5 further comprising particles of natural or organic material selected from the group consisting of spices and/or waste agricultural biomass and/or agricultural residues, renewable parts of trees and plants and combinations thereof.

8. The method according to claim 5 wherein organs of the plant in the *Cinnamomum* genus are selected from the group consisting of leaves, stems, inner bark, shavings from the inner bark, sawdust of inner bark, shavings from the outer bark, cinnamon chips, cinnamon quillings, cinnamon powder and flowers.

9. A method of preparing a mixture for a fuel source, the method comprising carbonization of wood particles and compression of the carbonized wood particles with raw particles of organs of a plant in the *Cinnamomum* genus and at least one binder whereby when ignited the mixture emits an aromatic cinnamon fragrance and flavor when raw particles burn.

10. The method according to claim 9 wherein the binder is selected from the group consisting of water, natural clay, grain starch, corn starch, wheat starch, maize flour, wheat flour, rice flour, cassava flour, potato starch, essential oils.

11. The method according to claim 9 further comprising particles of natural or organic material selected from the group consisting of spices and/or waste agricultural biomass and/or agricultural residues and/or renewable parts of trees and plants.

12. The method according to claim 9 wherein organs of the plant in the *Cinnamomum* genus are selected from the group consisting of leaves, stems, inner bark, shavings from the inner bark, sawdust of inner bark, shavings from the outer bark, cinnamon chips, cinnamon quillings, cinnamon powder and flowers.

* * * * *